(12) United States Patent
Inatani et al.

(10) Patent No.: US 6,993,780 B2
(45) Date of Patent: Jan. 31, 2006

(54) INCLINED ANGLE ADJUSTING MECHANISM AND INCLINED ANGLE ADJUSTING METHOD

(75) Inventors: Takeshi Inatani, Tokyo (JP); Shigehiro Itou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 102 days.

(21) Appl. No.: 10/406,280

(22) Filed: Apr. 4, 2003

(65) Prior Publication Data

US 2003/0235143 A1 Dec. 25, 2003

(30) Foreign Application Priority Data

Jun. 21, 2002 (JP) .............................. 2002-181803

(51) Int. Cl.
G11B 23/00 (2006.01)

(52) U.S. Cl. ...................................... 720/697; 720/674

(58) Field of Classification Search ................ 720/696, 720/697, 698, 700; 29/603.03
See application file for complete search history.

(56) References Cited

U.S. PATENT DOCUMENTS

| | | | | |
|---|---|---|---|---|
| 5,796,707 A | * | 8/1998 | Kim | 720/697 |
| 5,867,471 A | * | 2/1999 | Kim et al. | 720/697 |
| 6,005,836 A | * | 12/1999 | Choi | 720/697 |
| 6,014,362 A | * | 1/2001 | Park | 720/697 |
| 6,181,669 B1 | * | 1/2001 | Park | 720/697 |
| 6,236,636 B1 | * | 5/2001 | Ogusu | 720/697 |
| 6,324,152 B1 | * | 11/2001 | Eguchi et al. | 720/697 |
| 6,772,438 B1 | * | 8/2004 | Blackketter et al. | 725/136 |
| 2003/0112734 A1 | * | 6/2003 | Shishido et al. | 369/263 |

FOREIGN PATENT DOCUMENTS

| | | | |
|---|---|---|---|
| JP | 61-150162 A | | 7/1986 |
| JP | 8-17135 | * | 1/1996 |
| JP | 9-120567 | * | 5/1997 |
| JP | 9-251652 | * | 9/1997 |
| JP | 2000-48376 | | 2/2000 |
| JP | 2000-99974 A | | 4/2000 |
| JP | 2001-84685 | * | 3/2001 |

* cited by examiner

Primary Examiner—Angel Castro
(74) Attorney, Agent, or Firm—Birch, Stewart, Kolasch & Birch, LLP

(57) ABSTRACT

Of an integrated type leaf spring, a first abutting portion of first leaf spring portion of a narrow spring piece abuts against the bottom surface of a disk motor base to apply reactive force of the first leaf spring portion to the disk motor base. At the same time, a second abutting portion of a second leaf spring portion abuts against the top surface of a mechanical chassis base to apply reactive force of the second leaf spring portion to the mechanical chassis base. Reactive force of the narrow spring piece becomes the sum of the reactive force of the first leaf spring portion and the reactive force of the second leaf spring portion.

4 Claims, 13 Drawing Sheets

INCLINED ANGLE ADJUSTING MECHANISM AND INCLINED ANGLE ADJUSTING METHOD

This nonprovisional application claims priority under 35 U.S.C. § 119(a) on Patent Application No(s). 2002-181803 filed in JAPAN on Jun. 21, 2002, which is(are) herein incorporated by reference.

BACKGROUND OF THE INVENTION

1. Field of the Invention

The present invention relates to an inclined angle adjusting mechanism and an inclined angle adjusting method for finely adjusting the angle of rotary shaft of a disk motor with respect to the optical axis of an optical pickup in a disk device for recording or reproducing information on an optical disk.

2. Description of the Related Art

In general, in a disk device, a disk motor base is placed on a mechanical chassis side base (hereinafter referred to as a mechanical chassis base). To this disk motor base are fixed a turntable having an optical disk placed thereon and a disk motor for rotating this turntable. The respective rotary shafts of the disk motor and the turntable are set so as to be perpendicular to the disk motor base. Moreover, on the mechanical chassis base is arranged an optical pickup movable in a radial direction of the optical disk placed on the above mentioned turntable. Laser light of the optical pickup needs to be adjusted in such a way as to be substantially at right angle with respect to the optical disk in order to record or reproduce information on the optical disk. For this purpose, for example, as disclosed in Japanese Unexamined Patent Publication No. 2000-99974, between the mechanical chassis base and the disk motor base is arranged an inclined angle adjusting mechanism by which the angle of rotary shaft of the disk motor with respect to the optical axis of the optical pickup arranged on the mechanical chassis base is finely adjusted by finely adjusting an angle at which the disk motor base is mounted on the mechanical chassis base.

FIG. 17 is a cross sectional view to show the structure of an inclined angle adjusting mechanism in a disk device in the prior art disclosed in the above mentioned official patent gazette. In the drawing, a reference symbol 1 denotes an optical disk, 2 denotes a turntable on which the optical disk 1 is placed, 3 denotes a spindle motor (hereinafter referred to as a disk motor) for rotating the turntable 2, 3a denotes an output shaft of the disk motor 3, and 4 denotes a mechanical chassis base. In the mechanical chassis base 4 is made a circular opening 4a and in a peripheral edge portion of this opening portion 4a are formed three screw holes (in FIG. 17, only screw holes 4b and 4c are shown). On the other hand, disk motor 3 is fixed to the disk motor base 5, over its central hole 5a, and in the peripheral edge portion of this disk motor base 5 are formed three screw holes (in FIG. 17, only screw holes 5b and 5c are shown). The disk motor base 5 is fixed, for example, by screwing the screws 6b and 6c into the peripheral edge portion of the opening 4a of the mechanical chassis base 4. A spacer 7 is arranged between the mechanical chassis base 4 and the disk motor base 5 at an outer peripheral portion of the screw 6c. Moreover, a compression spring 8 as an urging spring is arranged between the mechanical chassis base 4 and the disk motor base 5 at the outer peripheral portion of the screw 6b. Here, the screw 6b and the compression spring 8 constitute an inclined angle adjusting mechanism in the prior art.

Next, an operation will be described.

By screwing in the screw 6c, a difference in height between the disk motor base 5 on the screw 6c side and the mechanical chassis base 4 is set by the thickness of the spacer 7. Next, a difference in height between the disk motor base 5 on the screw 6b side and the mechanical chassis base 4 is adjusted against the urging force of the compression spring 8 by screwing in the screw 6b. In this manner, an angle θ between the output shaft 3a of the disk motor 3 and the mechanical chassis base 4 is finely adjusted near substantially at 90 degrees.

However, since the inclined angle adjusting mechanism in the prior art has the above mentioned structure, it has the following problem.

In general, it is preferable that an urging spring in the inclined angle adjusting mechanism has such a low spring constant in a range of adjusting stroke as to vary an urging force as little as possible, but at the same time, it is also required that the urging spring has a holding force which is high enough to hold an inclined angle against vibrations and an impact force caused by the disk motor 3 after adjusting the inclined angle. For this reason, in a case where the urging spring is constituted by the compression spring as shown in FIG. 17, it is necessary to use the compression spring producing a strong urging force to give priority to holding the inclined angle after adjustment. In this case, it is difficult to perform an adjusting work. Moreover, in a case where the compression spring satisfying this required specification is used, it is necessary to provide a space in which the compression spring is arranged in the direction that adjusts height (product thickness), so that it is impossible to make a product thinner.

In contrast, there has been also known the inclined angle adjusting mechanism in which the urging spring is constituted by a leaf spring in place of the compression spring. In this case, there is presented the following first problem: although it is possible to become the product thinner by a use of the leaf spring, in order to satisfy the above mentioned specification, inevitably, its plan size is made larger and thus the whole mechanism is made larger in size, and in particular, an integrated type leaf spring integrally formed by a plurality of spring pieces can not satisfy the above mentioned required specification because in an integrated type leaf spring it is impossible to make only a spring piece which is made slender to avoid interfering with the other parts, of a material having a high spring force.

Further, there is presented the second problem that when parts such as disk motor base and the like are assembled, it is necessary to position parts against the leaf spring having a high urging force (reactive force) satisfying the above mentioned required specification and to fix them with screws, which results in making the assembling work and the following adjusting work troublesome.

Still further, there is presented the following third problem: when the disk motor base is positioned in the direction of plane of the mechanical chassis base before adjusting the inclined angle, when a cylindrical reference component provided on the mechanical chassis base is fitted in a circular hole made in the disk motor base, because the outer diameter of the reference component and the inside size of the circular hole vary within part tolerances, the gap between both of them varies; and this makes positioning unstable, and in particular, when a shift in position in the direction of the disk motor base which is related to a disk jitter becomes considerably large, it degrades reproducing characteristics.

Still further, there is presented the following fourth problem: in the inclined angle adjusting method using the adjusting screws and the leaf spring, the screws are loosened in some cases with the elapse of time after adjustment by vibrations and temperature changes to impair the adjustment; and as a countermeasure against this, it is thought to fix the screws with an adhesive after the adjustment, but since there is a case where parts of the disk motor base need to be replaced in some cases after they are fixed, the parts can not be completely fixed with the adhesive.

SUMMARY OF THE INVENTION

The present invention has been made to solve the above mentioned problems and it is the first object of the present invention to provide an inclined angle adjusting mechanism constituted by leaf spring which satisfies required specifications without enlarging a plan size and adjusting screws.

It is the second object of the present invention to provide an inclined angle adjusting mechanism constituted by leaf spring which produces a low reactive force when parts are assembled and adjusting screws.

It is the third object of the present invention to provide an inclined angle adjusting mechanism capable of adjusting an inclined angle with high accuracy with respect to a disk motor base which is positioned with respect to a mechanical chassis base with high accuracy.

It is the fourth object of the present invention to provide an inclined angle adjusting method for fixing a disk motor base to a mechanical chassis base in such a way that the disk motor base can be removed from the mechanical chassis base after adjusting an inclined angle.

An inclined angle adjusting mechanism in accordance with the present invention has: a leaf spring which is provided on a mechanical chassis base for slidably holding an optical pickup in a disk device and urges a disk motor base for fixing a disk motor in a direction which separates the disk motor base from the mechanical chassis base; and an adjusting screw for applying a load to the leaf spring against its urging force, wherein the leaf spring is an integrated type leaf spring including a single metal plate and a plurality of spring pieces made by cutting and bending the metal plate, and of the integrated type metal spring, the narrow spring piece is bent in the direction in which it is deflected and is formed into a first spring portion having a first abutting portion contacting the disk motor base and a second spring portion having a second abutting portion contacting the mechanical chassis base.

Thus, according to the present invention, it is possible to produce an effect of expanding a region acting as a spring by bending the narrow spring piece and thus of ensuring a high holding force to be required without enlarging the plan size.

Moreover, an inclined angle adjusting method includes the steps of: adjusting an angle between an optical axis of an optical pickup and a rotary shaft of a disk motor in a disk device while applying a load to an integrated type leaf spring, which is provided on a mechanical chassis base for slidably holding the optical pickup and supports a disk motor base for fixing the disk motor, against its urging force by an adjusting screw; and then applying solder between a hole of the disk motor base and a reference component arranged on the mechanical chassis base to fix the disk motor base to the mechanical chassis base.

Therefore, according to the present invention, it is possible to fix both the bases further firmly, to prevent a shift in position, and thus to improve reliability in holding the inclined angle adjustment. Moreover, it is possible to produce an effect of separating both the bases from each other by heating and removing the solder and thus to easily perform a work such as replacing the disk motor base and the like.

DETAILED DESCRIPTION OF THE PREFERRED EMBODIMENTS

The preferred embodiments of the present invention will be described in the following.

Embodiment 1

Figure 1:
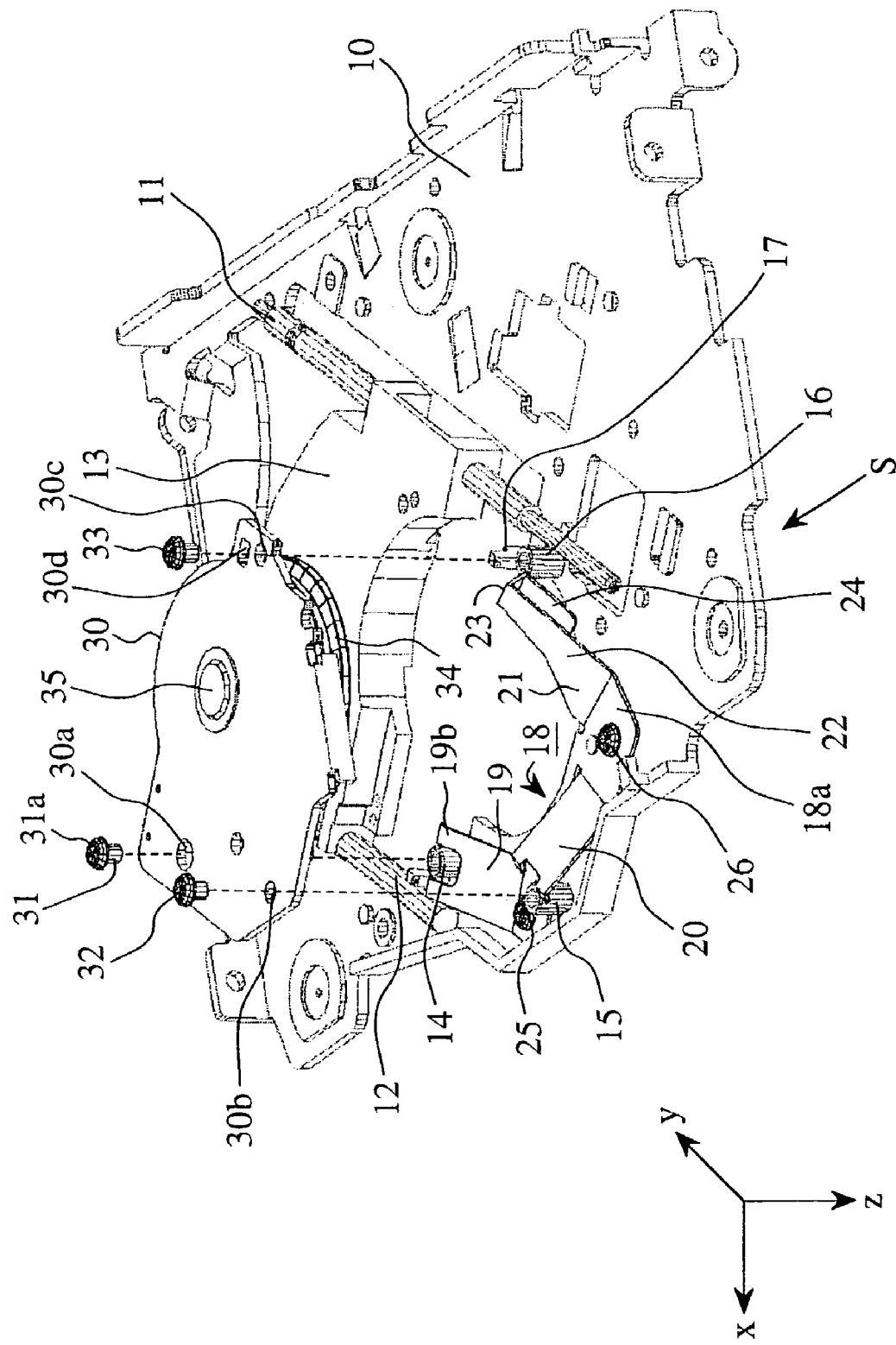
FIG. 1 is an exploded perspective view to show the structure of an inclined angle adjusting mechanism in accordance with embodiment 1 of the present invention and the structure of a disk device provided with the inclined angle adjusting mechanism.
Figure 2:
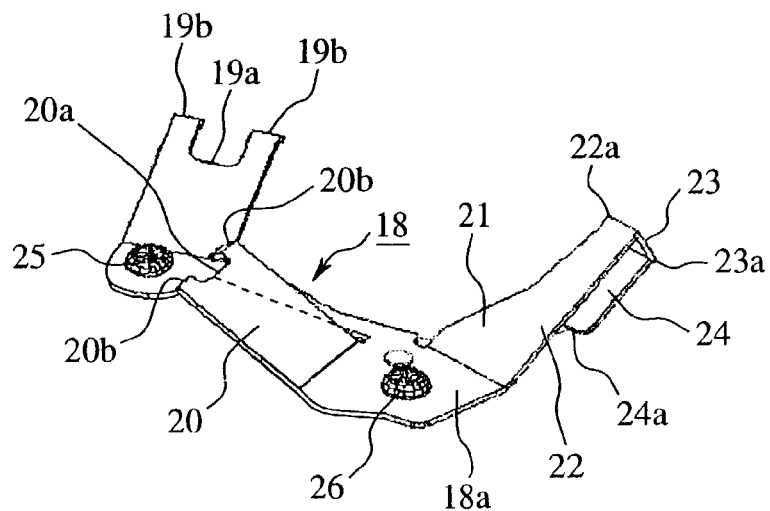
FIG. 2 is a schematic perspective view to show the relevant part in FIG. 1 with an enlarged scale.
Figure 3:
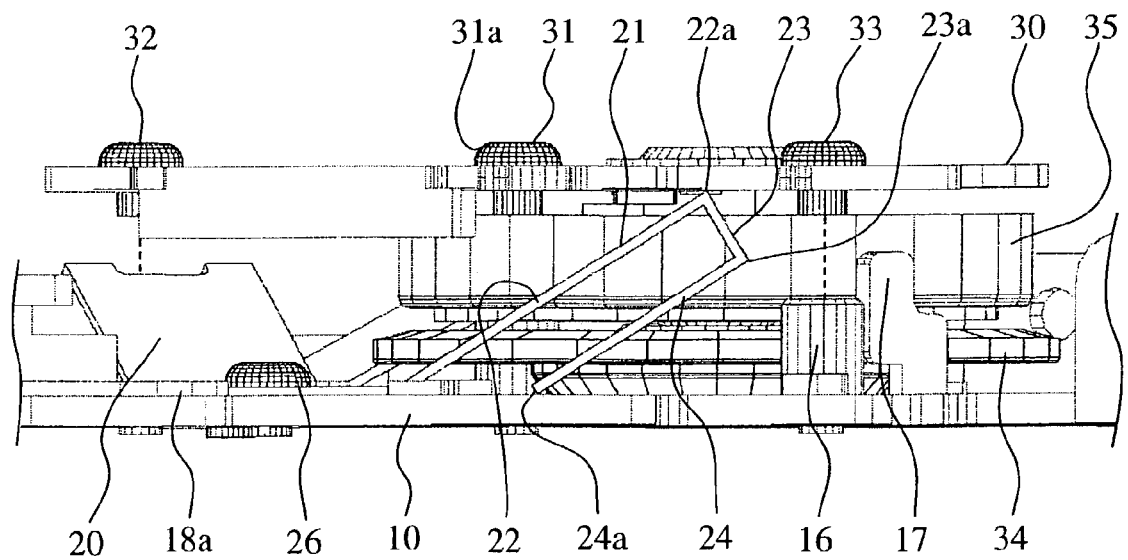
FIG. 3 is a schematic view of the relevant part shown in FIG. 1 when viewed from the direction of an arrow S.
Figure 4:
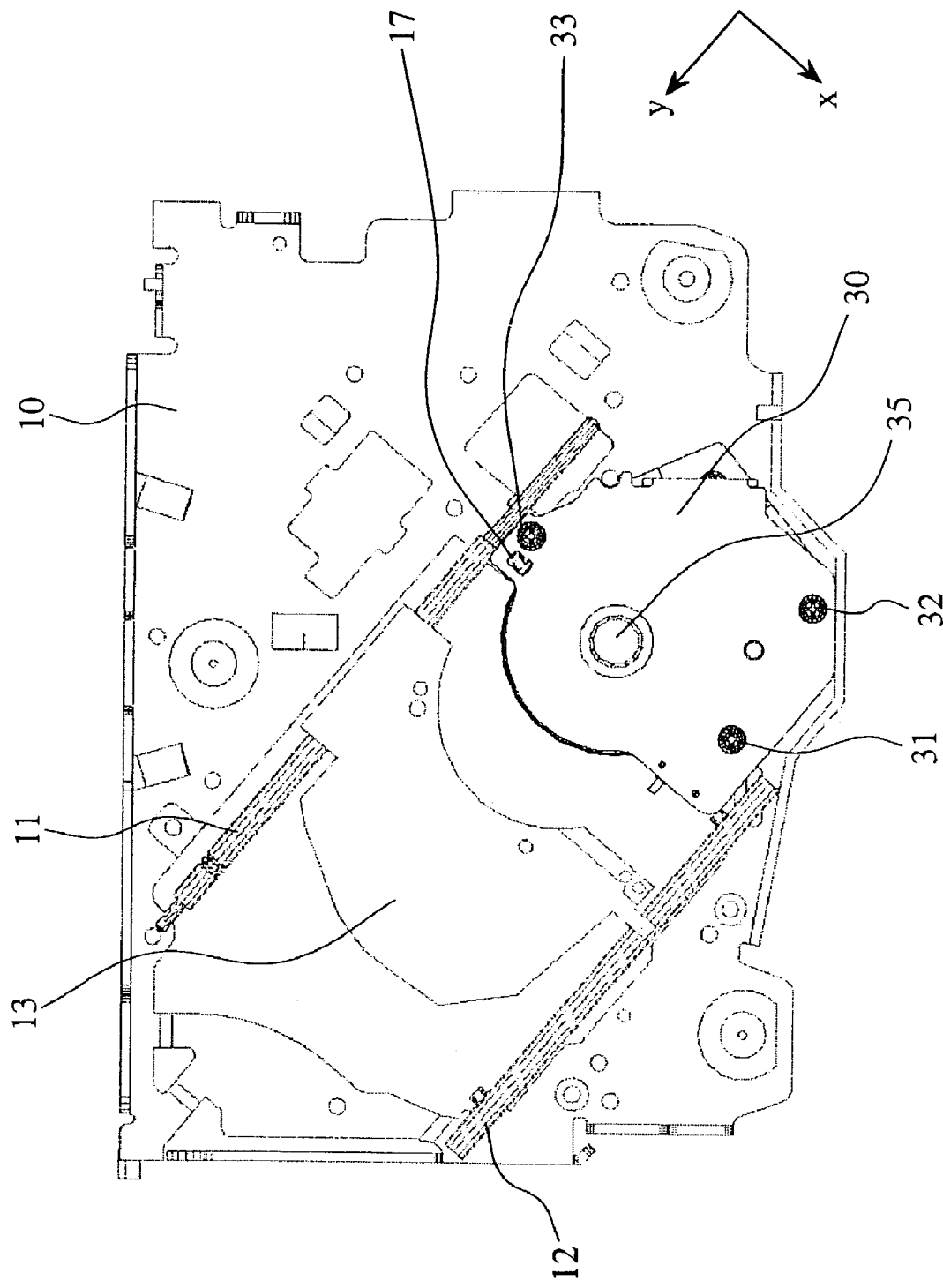
FIG. 4 is a view to show the structure of the disk device shown in FIG. 1 when viewed from the direction of an arrow Z, in which an inclined angle is already adjusted.
Figure 5:
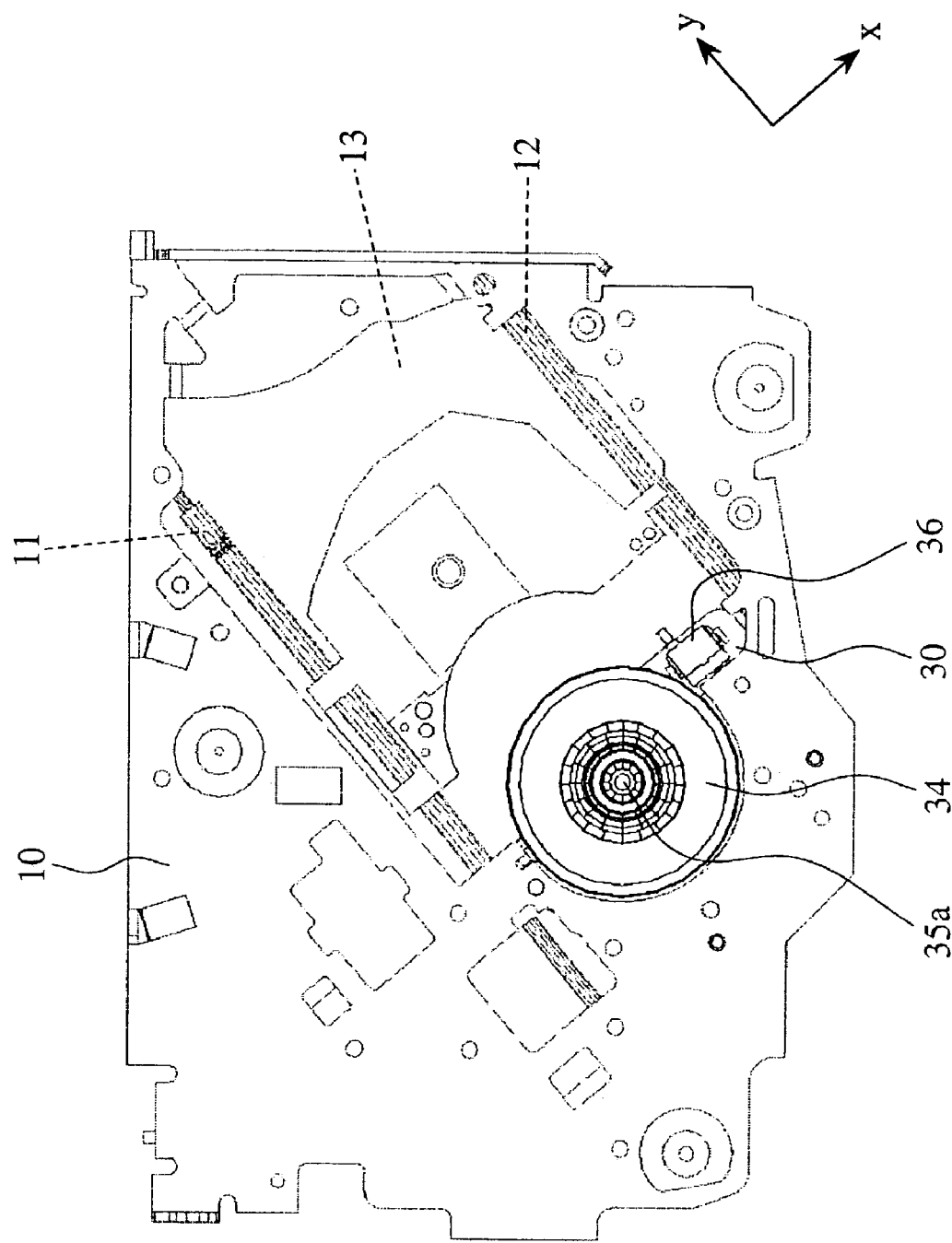
FIG. 5 is a view to show the structure of the disk device shown in FIG. 1 when viewed from the direction of an arrow Z(−), in which an inclined angle is already adjusted.

FIG. 1 is an exploded perspective view to show the structure of an inclined angle adjusting mechanism in accordance with embodiment 1 of the present invention and the structure of a disk device provided with the inclined angle adjusting mechanism, and FIG. 2 is a schematic perspective view to show the relevant part in FIG. 1 with an enlarged scale. FIG. 3 is a schematic view of the relevant part shown in FIG. 1 when viewed from the direction of an arrow S, and FIG. 4 is a view to show the structure of the disk device shown in FIG. 1 when viewed from the direction of an arrow Z in which an inclined angle is already adjusted. FIG. 5 is a view to show the structure of the disk device shown in FIG. 1 when viewed from the direction of an arrow Z(−) in which an inclined angle is already adjusted. Here, X axes, Y axes, and Z axes in these drawings are identical to each other.

In the drawings, a reference numeral 10 denotes a mechanical chassis base in the disk device. On the bottom surface of the mechanical chassis base 10, as shown in FIG. 1 and FIG. 4, are arranged a pair of guide shafts 11 and 12 along the direction of the Y axis. An optical pickup 13 is slidably supported by these guide shafts 11 and 12. A cylindrical reference component 14 and screw components 15 and 16 are arranged at positions corresponding to outer end portions of a disk motor base, which will be described later, in a region on the bottom surface of the mechanical chassis base 10 and on one end side of both the guide shafts 11 and 12. Moreover, a detent part 17 which is rectangular in cross section and prevents the disk motor base which will be described later, from being rotated, is provided integrally with the mechanical chassis base 10 near the screw component 16 on the bottom surface of the mechanical chassis base 10.

An integrated type leaf spring 18 for supporting the disk motor base which will be described later, at three points is fixed to the bottom surface of the mechanical chassis base 10 near the screw components 15 and 16. The integrated type leaf spring 18, as shown in FIG. 2, for example, is formed by cutting a single metal plate into three spring pieces 19, 20 and 21 and by bending them slantwise toward the disk motor base which will be described later. The spring piece 19 has a depressed portion 19a at the central portion of its tip to avoid contacting a reference component 14 and a pair of abutting portions 19b formed at positions pinching this depressed portion 19a and contacting one surface of the disk motor base which will be described later. The spring piece 20 has a depressed portion 20a at the central portion of its tip to avoid contacting the screw component 15 and a pair of abutting portions 20b formed at positions pinching this depressed portion 20a and contacting one surface of the disk motor base which will be described later. The spring piece 21 is set to be more slender and smaller in plan size than the other spring pieces 19 and 20 to avoid contacting the other components such as a turntable, which will be described later, and the like. Further, the spring piece 21 is bent in the direction in which it is deflected (in the direction of Z in FIG. 1) to be formed in the shape of a letter C in cross section, and is roughly constituted by a first spring portion 22 extending slantwise toward one surface of the disk motor base which will be described later, from a base surface portion 18a, a connecting portion 23 which is formed by bending the top end portion of this first spring portion 22 at substantially right angle and extends slantwise toward the bottom surface of the mechanical chassis 10, and a second spring portion 24 extending parallel to a direction in which the first spring portion 22 extends from the bottom bent portion 23a of this connecting portion 23. The outside of top bent portion of the first spring portion 22 becomes a first abutting portion 22a contacting one surface of the disk motor base which will be described later, and the outside of bottom portion of the second spring portion 24 becomes a second abutting portion 24a contacting the bottom surface of the mechanical chassis base 10.

The integrated type leaf spring 18 having this structure is fixed at its base surface portion 18a to the bottom surface of the mechanical chassis base 10 with fixing screws 25 and 26 and a disk motor base 30 is arranged on this leaf spring 18, as shown in FIG. 1. In the disk motor base 30 at predetermined positions are formed a positioning hole 30a for receiving the top end of the reference component 14 of the mechanical chassis base 10, screw holes 30b and 30c for receiving the top ends of the screw components 15 and 16, and a detent hole 30d which is made in a shape rectangular in cross section to receive the top end of the detent part 17. The top end of the reference component 14 inserted into the positioning hole 30a has a female screw (not shown) cut therein and has a fixing screw 31 mounted thereon. Moreover, top ends of the screw components 15 and 16 have female screws (not shown) cut therein and are mounted with adjusting screws 32 and 33, respectively. Here, the positioning of the disk motor base 30 in a X-Y plane with respect to the mechanical chassis base 10 is performed by defining its turning center in the X-Y plane by fitting the reference component 14 in the positioning hole 30a and by preventing its turning in the X-Y plane by engaging the detent part 17 with the detent hole 30d.

Under the disk motor base 30 is arranged a turntable 34 for driving an optical disk (not shown) placed thereon and in the central portion of the disk motor base 30 is arranged a disk motor 35 having a rotary shaft 35a for supporting the turntable. In this respect, as shown in FIG. 5, at a part of surface (bottom surface) of the disk motor base 30 is arranged a switch 36 for detecting the position, on an inner peripheral side in the radial direction of the disk, of the optical pickup 13.

Next, an operation will be described.

The disk motor base 30 is arranged over the mechanical chassis base 10 via the integrated type leaf spring 18 and is always urged in the direction of Z(−) with the fixing screw 31, the adjusting screws 32 and 33 slightly screwed into the direction of Z by the reactive forces of three spring pieces 19, 20, and 21 of the integrated type leaf spring 18. In this state, according to the amount of screwing in the respective screws, it is possible to adjust the height and inclination, in the direction of Z, of the disk motor base 30 with respect to the mechanical chassis base 10. In this adjustment, a height reference in the direction of Z of the disk motor base 30 is regulated by the height of top end surface of the reference component 14. That is to say, by screwing the fixing screw 31 in a position where its screw head 31a contacts the top end surface of the reference component 14, the height of the fixing screw 31 is determined and the height of the disk motor base 30 contacting the screw head 31a, is regulated.

Next, the adjustment of inclination of the disk motor base 30 is performed by moving the adjusting screws 32 and 33 in the direction of Z(+) or in the direction of Z(−). That is to say, adjustment around the X axis is performed by moving the adjusting screw 32 in the direction of Z(+) or in the direction of Z(−) and by turning the disk motor base 30 around a rotary shaft the height of which is regulated by the fixing screw 31 and the adjusting screw 33. Moreover, adjustment around the Y axis is performed by moving the adjusting screw 33 in the direction of Z(+) or in the direction of Z(−) and by turning the disk motor base 30 around a rotary shaft the height of which is regulated by the fixing screw 31 and the adjusting screw 32.

In this adjustment of the inclination, as shown in FIG. 3, the first abutting portion 22a of the first leaf spring portion 22 of the narrow spring piece 21 of the integrated type leaf spring 18, abuts against the bottom surface of the disk motor base 30 to thereby apply the reactive force in the direction of Z(−) of the first leaf spring portion 22, which is reactively generated when the adjusting screw 33 is screwed in the direction of Z(+), to the disk motor base 30. At the same time, the second abutting portion 24a of the second leaf spring portion 24 abuts against the top surface of the mechanical chassis base 10 to thereby apply the reactive force in the direction of Z(+) of the second leaf spring portion 24 to the mechanical chassis base 10. As a result, the reactive force of the narrow spring piece 21 is the sum of the reactive force of the first leaf spring portion 22 and the reactive force of the second leaf spring portion 24 and is equal to the reactive forces of the other spring pieces 19 and 20. Thus, it is possible to stabilize the reactive force of the integrated type leaf spring 18 and to surely hold the height and inclination of the disk motor base 30.

As described above, according to this embodiment 1, the narrow spring piece 21 of the integrated type leaf spring 18 constituting the inclined angle adjusting mechanism is bent in the direction in which it is deflected into the shape of a letter C in cross section to thereby form the first leaf spring portion 22 and the second leaf spring portion 24, so that it is possible to produce an effect of expanding a region acting as a spring without enlarging the plan size of the spring piece 21 and thus of ensuring a high holding force to be required. In this respect, while the width of only the spring piece 21 of the integrated type leaf spring 18 is set narrower than those of the other spring pieces 19 and 20 in this embodiment 1, there is also a case where the width of the other spring piece 19 or 20 is set narrower than the spring piece 21, depending on the position where the integrated type leaf spring 18 is arranged and the relationship between it and the other components. In this case, as is the case with the spring piece 21 in this embodiment 1, it is also recommended that also the other spring piece 19 or 20 be bent in the shape of a letter C in cross section to secure the high holding force to be required.

Embodiment 2

Figure 6:
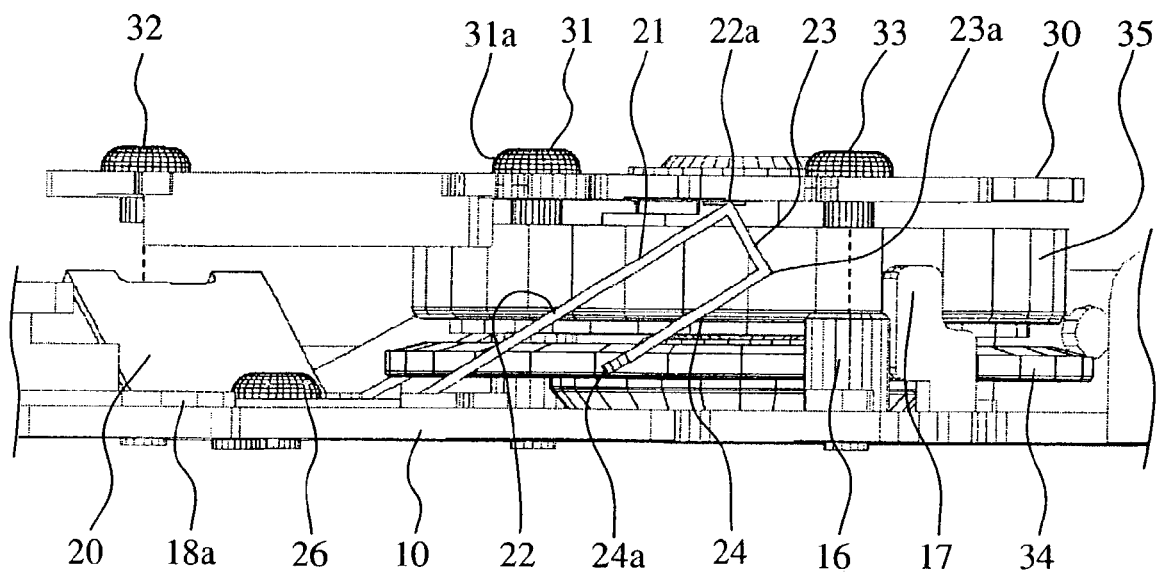
FIG. 6 is a side view to show the structure of an inclined angle adjusting mechanism in accordance with embodiment 2 of the present invention in a state just after starting to screw in adjusting screws.
Figure 7:
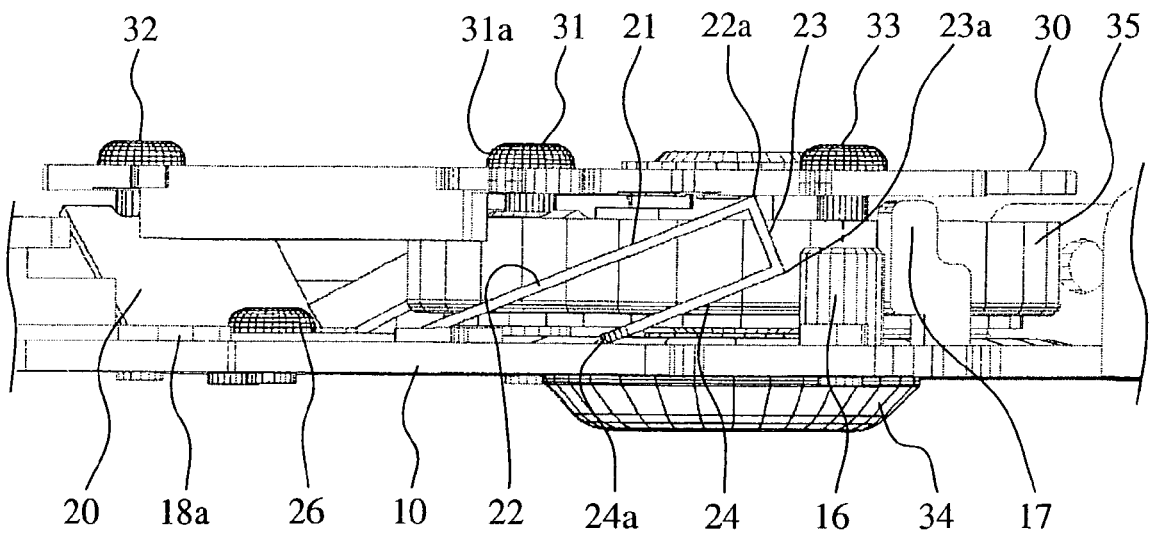
FIG. 7 is a side view to show a state where screwing in the adjusting screws is further continued after the state shown in FIG. 6.
Figure 8:
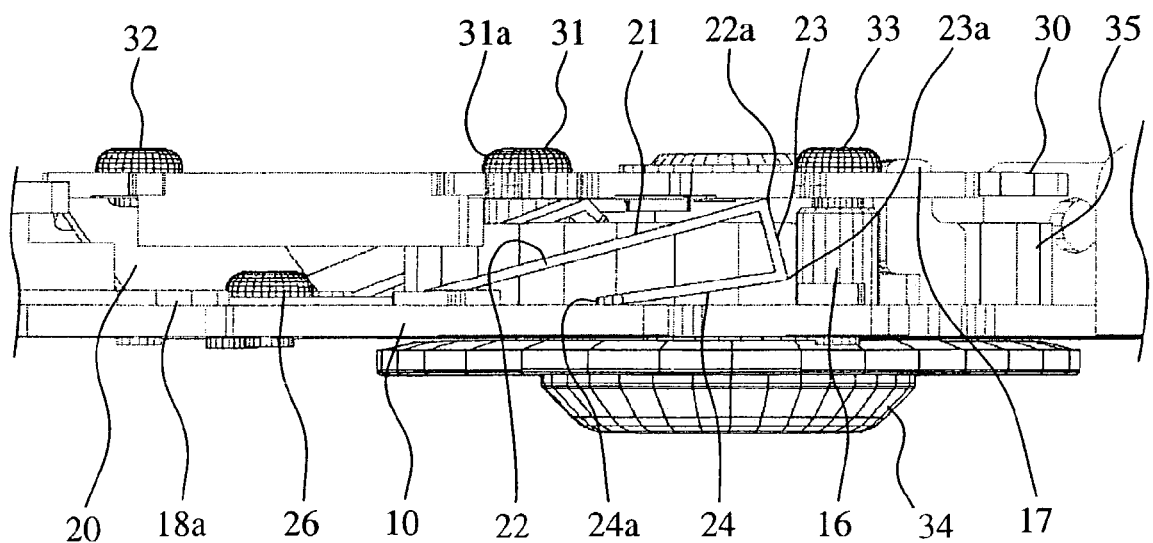
FIG. 8 is a side view to show a state where screwing in the adjusting screws is still further continued after the state shown in FIG. 7.

FIG. 6 shows the structure of an inclined angle adjusting mechanism according to embodiment 2 of the present invention and a state just after starting to screw in adjusting screws. FIG. 7 is a side view to show a state where screwing in the adjusting screws is further continued after the state shown in FIG. 6. FIG. 8 is a side view to show a state where screwing in the adjusting screws is still further continued after the state shown in FIG. 7. Here, among the constituent components of the inclined angle adjusting mechanism according to this embodiment 2, the components common to the constituent components of the inclined angle mechanism of the embodiment 1 are denoted by the same reference symbols and their further descriptions will be omitted.

A feature of this embodiment 2 lies in that, of the integrated type leaf spring 18, the second abutting portion 24a, which is the tip portion of the second leaf spring portion 24 of the narrow spring piece 21, is put into contact with the top surface of the mechanical chassis base 10 in the process of screwing in the adjusting screw 33.

Next, an operation will be described.

In an initial step of adjusting an inclination around the Y axis, as shown in FIG. 6, of the integrated type leaf spring 18, only the first abutting portion 22a of the first leaf spring portion 22 of the narrow spring piece 21 abuts against the bottom surface of the disk motor base 30 to thereby apply the reactive force in the direction of Z(−) of the first leaf spring portion 22, which is reactively generated when the adjusting screw 33 is screwed in the direction of Z(+), to the disk motor base 30. At this time, the second abutting portion 24a of the second leaf spring portion 24 is separated from the top surface of the mechanical chassis base 10 and thus the mechanical chassis base 10 does not receive the reactive force in the direction of Z(+) of the second leaf spring portion 24. Thus, in the initial step of adjustment, the reactive force of the spring piece 21 generated reactively to screwing in the adjusting screw 33 is small, so that it is possible to easily perform works such as positioning, setting with screws and the like at the time of assembling.

Next, by further screwing in the adjusting screw 33, as shown in FIG. 7 and FIG. 8, the second abutting portion 24a of the second leaf spring portion 24 of the spring piece 21 abuts against the top surface of the mechanical chassis base 10 and then also the second leaf spring portion 24 is deflected in the direction of Z(+) with the bottom bent portion 23a of the connecting portion 23 at a pivot. By this arrangement, not only the urging force of the first leaf spring portion 22 but also that of the second leaf spring portion 24 is applied to the disk motor base 30. Thus, the height and inclination of the disk motor base 30 with respect to the mechanical chassis base 10 can be held in the direction of Z(−) by a larger spring force as compared with the spring force of only the first leaf spring portion 22 at the initial step of adjustment.

In this respect, if the sizes of respective portions of the spring piece 21 are adjusted in such a way that when the second abutting portion 24a of the second leaf spring portion 24 of the spring piece 21 starts to abut against the top surface of the mechanical chassis base 10, the disk motor base 30 is brought to an arbitrary position after which the disk motor base 30 reaches a predetermined position with respect to the mechanical chassis base 10, it is possible to substantially vary the urging force applied to the disk motor base 30 before and after the second abutting portion 24a abuts against the top surface of the mechanical chassis base 10.

As described above, according to this embodiment 2, the second abutting portion 24a which is the tip portion of the second leaf spring portion 24 of the spring piece 21 is so constituted as to be put into contact with the top surface of the mechanical chassis base 10 in the process of screwing in the adjusting screw 33, so that before the contact, because reactive force of the spring piece 21 is small, it is possible to produce an effect of easily performing works such as positioning, setting with screws and the like at the time of assembling, and after the contact, because the reactive force of the spring piece 21 is made larger, it is possible to produce an effect of stably holding, by the large reactive force, the height and inclination of the disk motor base 30 with respect to the mechanical chassis base 10.

Embodiment 3

Figure 9:
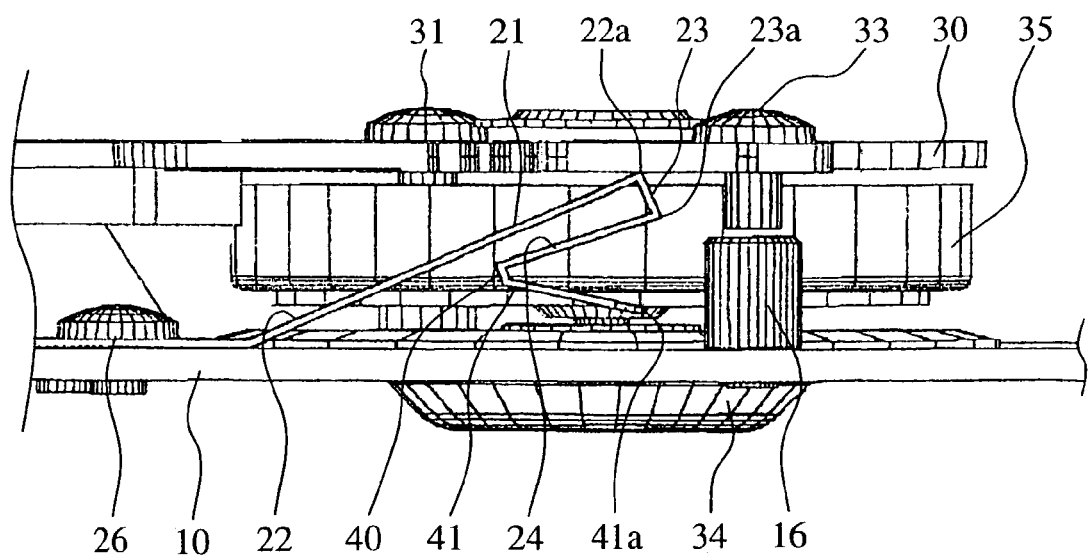
FIG. 9 is a side view to show the structure of an inclined angle adjusting mechanism in accordance with embodiment 3 of the present invention.

FIG. 9 is a side view to show the structure of an inclined angle adjusting mechanism according to embodiment 3 of the present invention. Here, among the constituent components of the inclined angle adjusting mechanism according to this embodiment 3, the components common to the constituent components of the inclined angle mechanism of the embodiment 1 and the embodiment 2 are denoted by the same reference symbols and their further descriptions will be omitted.

A feature of this embodiment 3 lies in that the spring piece 21 is so constructed as to be bent in the shape of a letter Z in cross section, in contrast to the embodiment 1 and the embodiment 2 in which the spring piece 21 is so constructed as to be bent in the shape of a letter C in cross section. That is to say, the spring piece 21 in this embodiment 3 is constructed by bending the second leaf spring portion 24 of the spring piece 21 in the embodiment 1 and the embodiment 2 in the direction that returns to the bottom bent portion 23a of the connecting portion 23. In FIG. 9, a reference numeral 40 denotes the bottom bent portion of the second leaf spring portion 24, 41 denotes a third leaf spring portion connected to the second leaf spring portion 24 via this bottom bent portion 40, and 41a denotes the bottom end of the third leaf spring portion 41, which is the second abutting portion to be put into contact with the top surface of the mechanical chassis base 10 in the process of screwing in the adjusting screw 33.

As described above, according to this embodiment 3, the spring piece 21 is so constituted as to be bent in the shape of a letter Z in cross section, which is substantially equal to the spring piece 21 in the embodiment 2 in which the spring piece 21 is so constructed as to be bent in the shape of a letter C in cross section, so that before the contact, because reactive force of the spring piece 21 is small, it is possible to produce an effect of easily performing works such as positioning, setting with screws and the like at the time of assembling, and after the contact, because the reactive force of the spring piece 21 is made larger, it is possible to produce an effect of stably holding, by the large reactive force, the height and inclination of the disk motor base 30 with respect to the mechanical chassis base 10.

Embodiment 4

Figure 10:
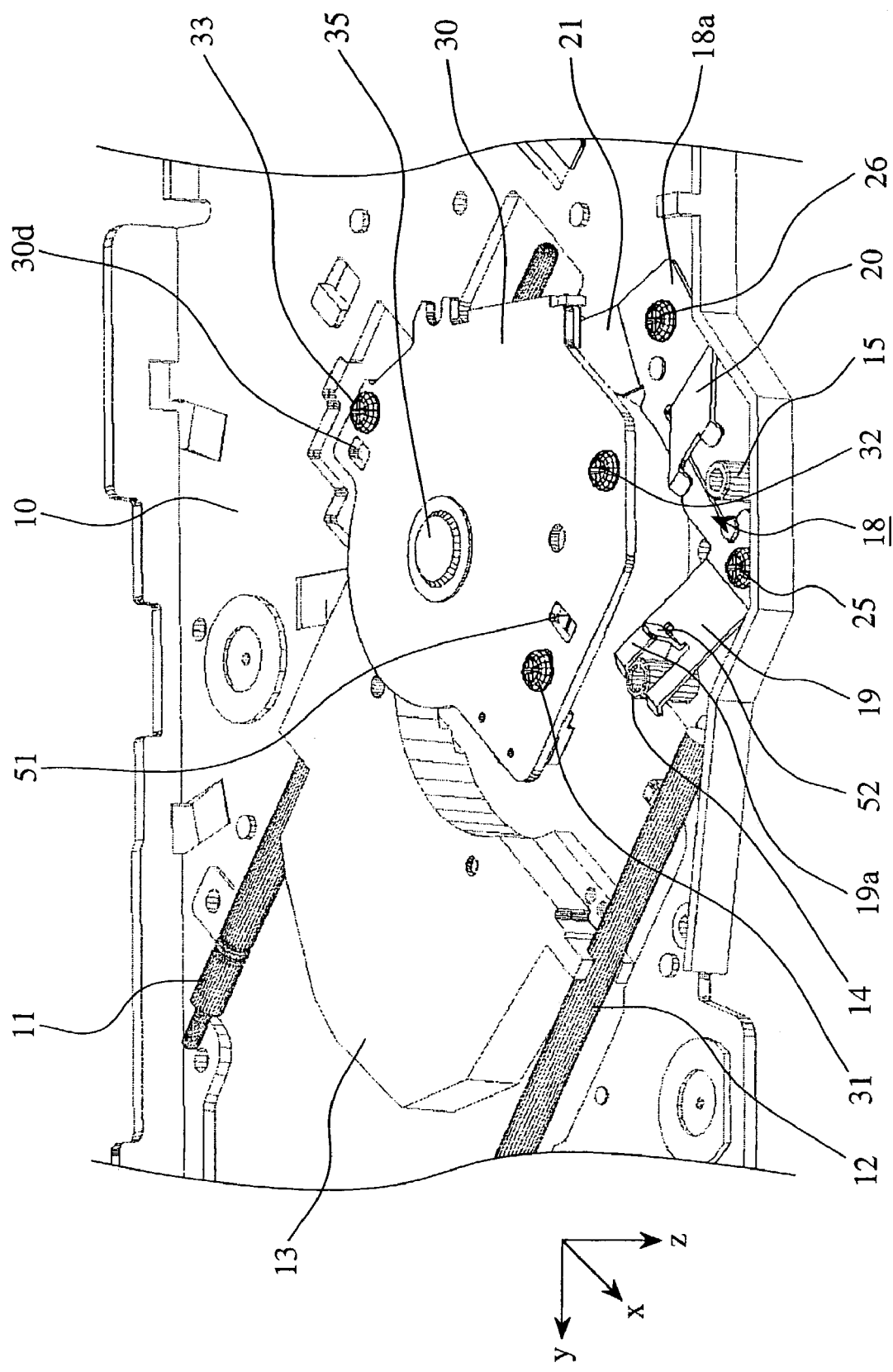
FIG. 10 is an exploded perspective view to show the structure, before adjustment, of the inclined angle adjusting mechanism in accordance with the embodiment 4 of the present invention and the structure of the disk device provided with the inclined angle adjusting mechanism.
Figure 11:
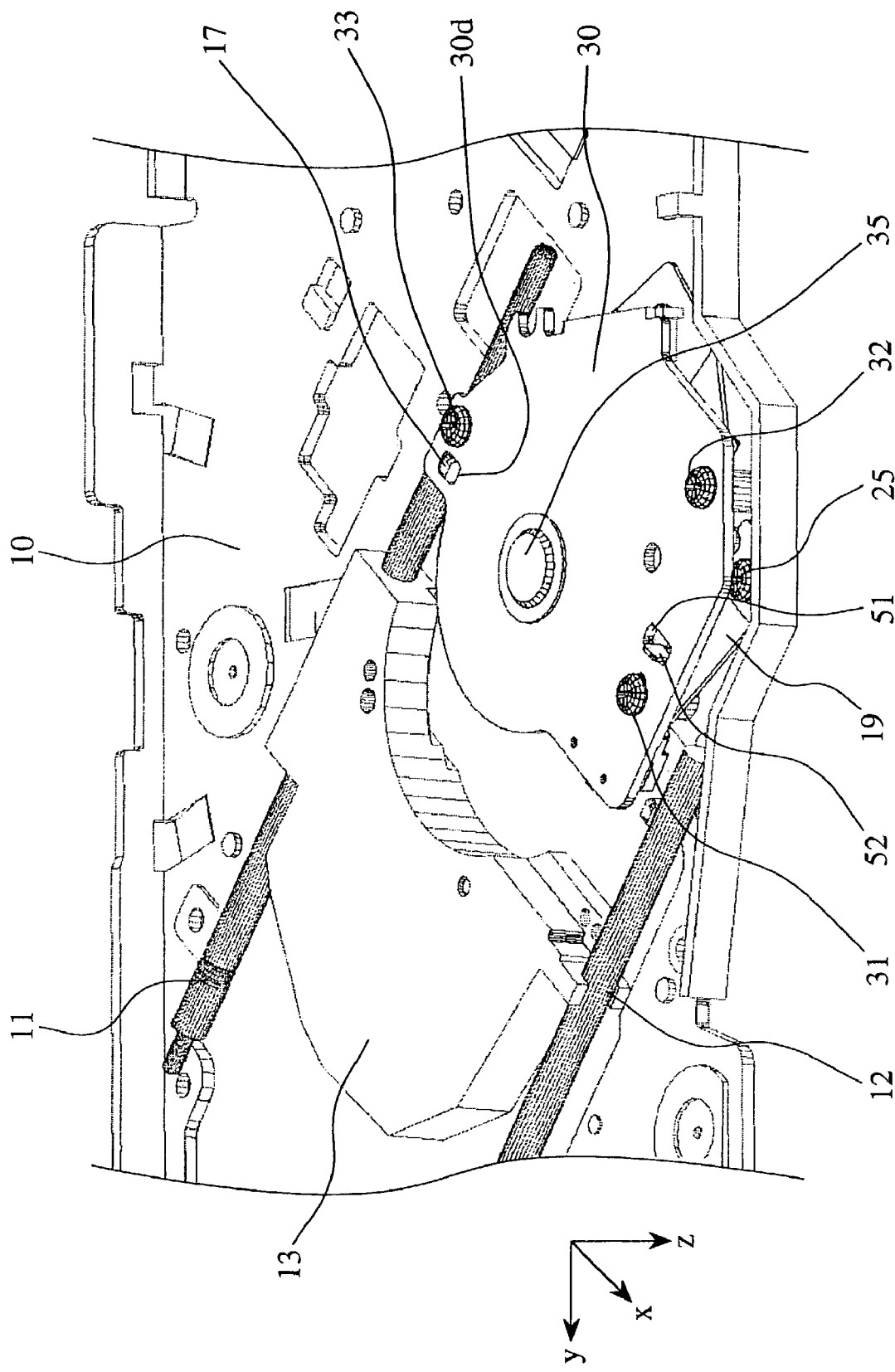
FIG. 11 is an exploded perspective view to show the structure, after adjustment, of an inclined angle adjusting mechanism in accordance with embodiment 4 of the present invention and the structure of a disk device provided with the inclined angle adjusting mechanism.
Figure 12:
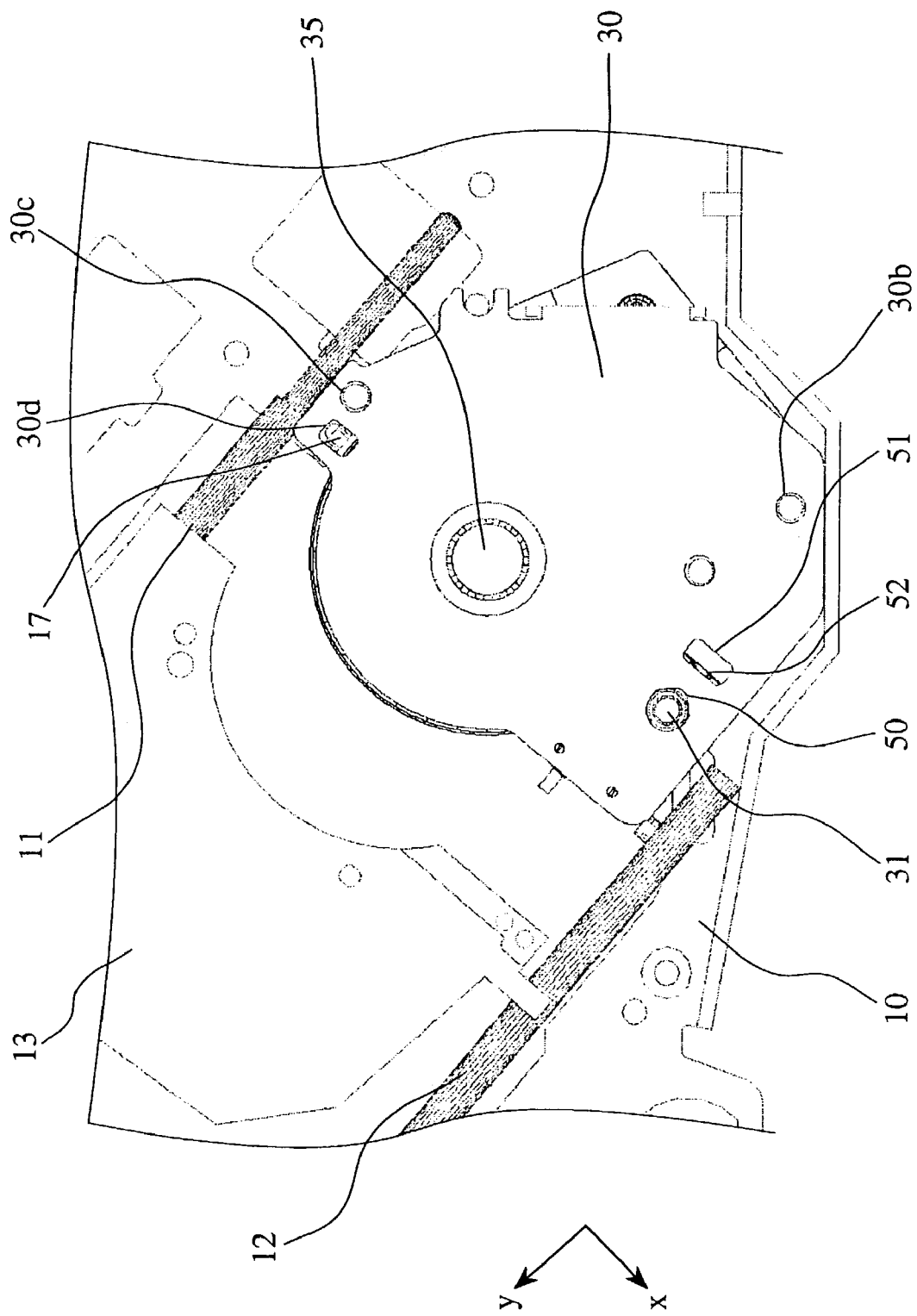
FIG. 12 is a schematic plan view to show the structure of the inclined angle adjusting mechanism and the disk device shown in FIG. 11.
Figure 13:
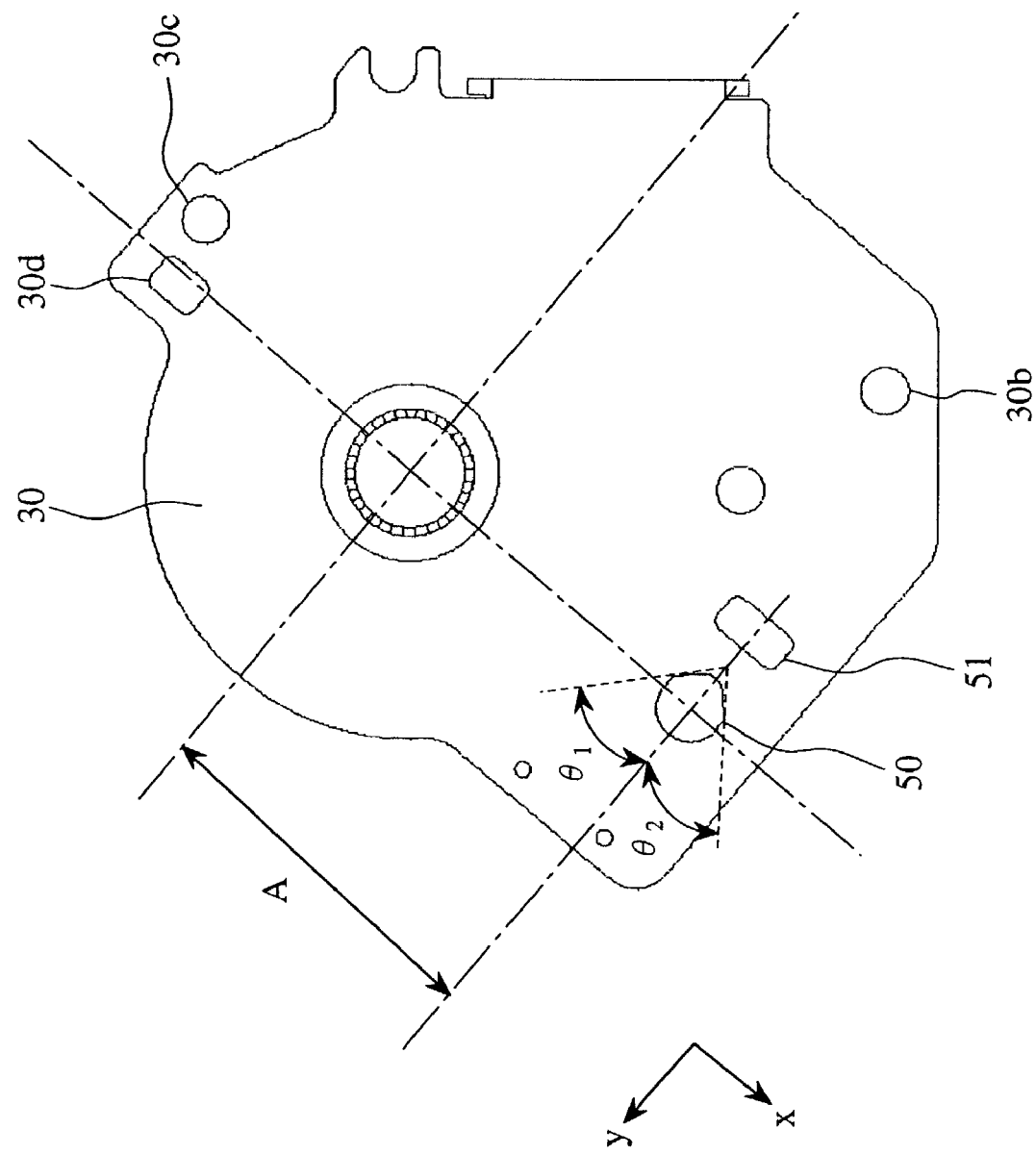
FIG. 13 is a plan view to show the structure of a disk motor base in the disk device shown in FIG. 11.

FIG. 10 is an exploded perspective view to show the structure, before adjustment, of an inclined angle adjusting mechanism according to embodiment 4 of the present invention and the structure of a disk device provided with the inclined angle adjusting mechanism. FIG. 11 is an exploded perspective view to show the structure, after adjustment, of the inclined angle adjusting mechanism according to the embodiment 4 of the present invention and the structure of the disk device provided with the inclined angle adjusting mechanism. FIG. 12 is a schematic plan view to show the structure of the inclined angle adjusting mechanism and the disk device shown in FIG. 11. FIG. 13 is a plan view to show the structure of a disk motor base in the disk device shown in FIG. 11. Here, among the constituent components of the inclined angle adjusting mechanism according to this embodiment 4, the components common to the constituent components of the inclined angle mechanism of from the embodiment 1 to the embodiment 3 are denoted by the same reference symbols and their further descriptions will be omitted.

A feature of this embodiment 3, as shown in FIG. 13, lies in that a positioning hole 50 having a V-shaped portion which is symmetric with respect to the Y axis (where (1=(2) is made in the disk motor base 30 and that a through hole 51 rectangular in cross section is made near this positioning hole 50 and that a pressing piece 52 capable of being inserted into the above mentioned through hole 51 is formed on the spring piece 19 of the integrated type leaf spring 18. The pressing piece 52 is formed by cutting and bending a part of the depressed portion 19a of the spring piece 19 in the direction opposite to the direction in which it is deflected.

Next, an operation will be described.

Positioning the disk motor base 30 in the X-Y plane with respect to the mechanical chassis base 10 is performed by pressing the V-shaped portion of the positioning hole 50 against the outer peripheral side surface of the cylindrical reference component 14 to define a turning center in the X-Y plane and by engaging the detent part 17 with the detent hole 30d to prevent the disk motor base 30 from turning in the X-Y plane. At this time, an urging force for pressing the V-shaped portion of the positioning hole 50 of the disk motor base 30 against the outer peripheral side surface of the reference component 14 is produced as follows: when the disk motor base 30 is arranged at a predetermined position with respect to the mechanical chassis base 10, the pair of abutting portions 19b of the leaf spring portion 19 are put into contact with the bottom surface of the disk motor base 30 to be bent in the direction of Z, whereby the pressing piece 52 provided on the leaf spring portion 19 is displaced in the direction of Y to press the side surface of the positioning hole 51 in the direction of Y against the outer peripheral side surface of the reference component 14.

As described above, according to this embodiment 4, the pressing piece 52 for pressing the V-shaped portion of the positioning hole 50 against the cylindrical reference component 14 is so constructed as to be provided on the spring piece 19, for example, so that it is possible to produce an effect of positioning, with high accuracy, the disk motor base 30 with respect to the mechanical chassis base 10 in the direction (a size A shown in FIG. 13) vertical to the above mentioned pressing direction even if the outer diameter size of the reference component 14 varies within part tolerances.

In this embodiment 4, the pressing piece 52 is so constructed as to be integrated with the integrated type leaf spring 18 for urging the disk motor base 30 in the direction of Z(−), so that it is possible to produce an effect of preventing an increase in the number of parts and thus avoiding an increase in cost.

Embodiment 5

Figure 14:
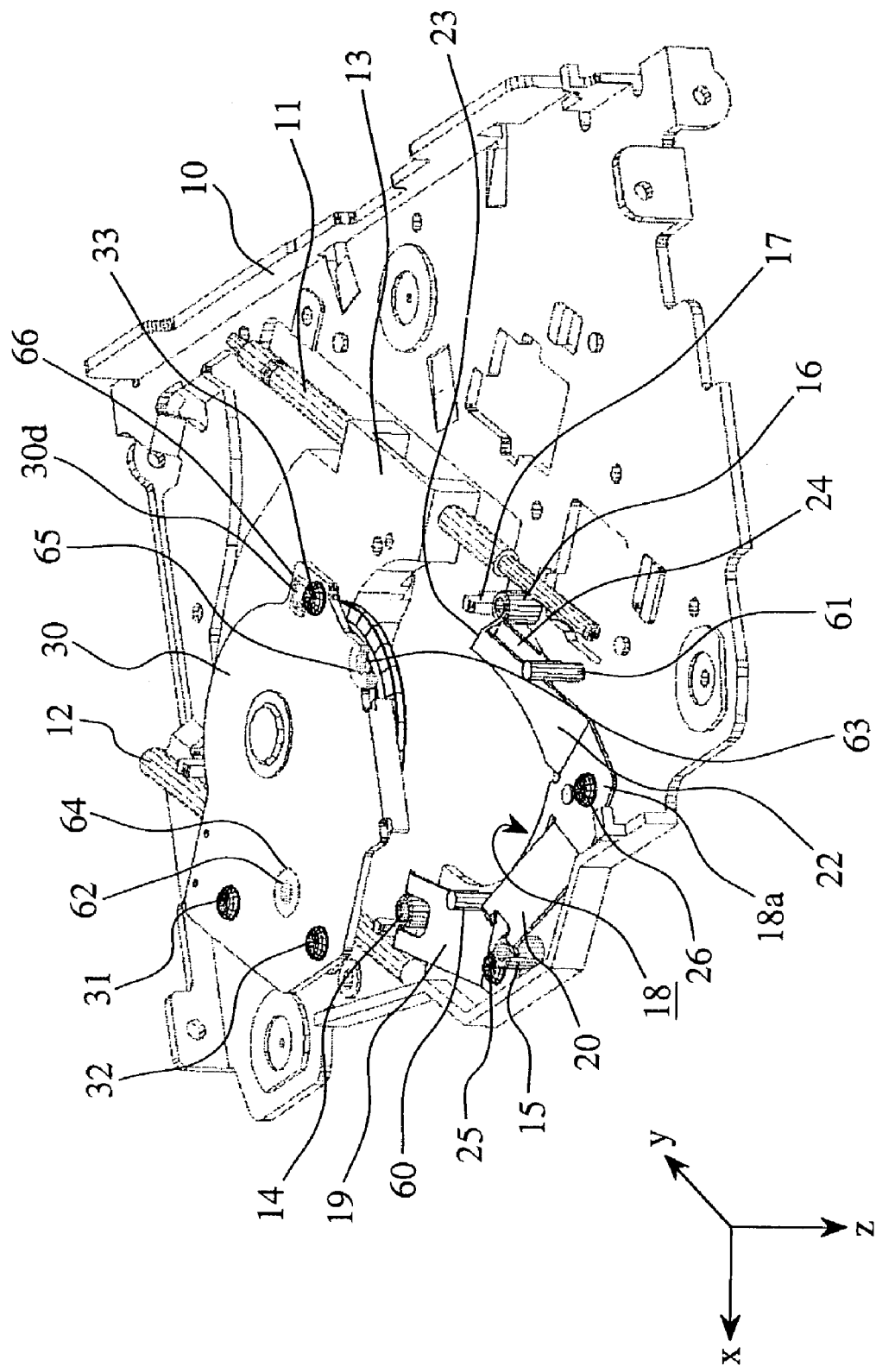
FIG. 14 is an exploded perspective view to show the structure, before adjustment, of an inclined angle adjusting mechanism in accordance with embodiment 5 of the present invention and the structure of a disk device provided with the inclined angle adjusting mechanism.
Figure 15:
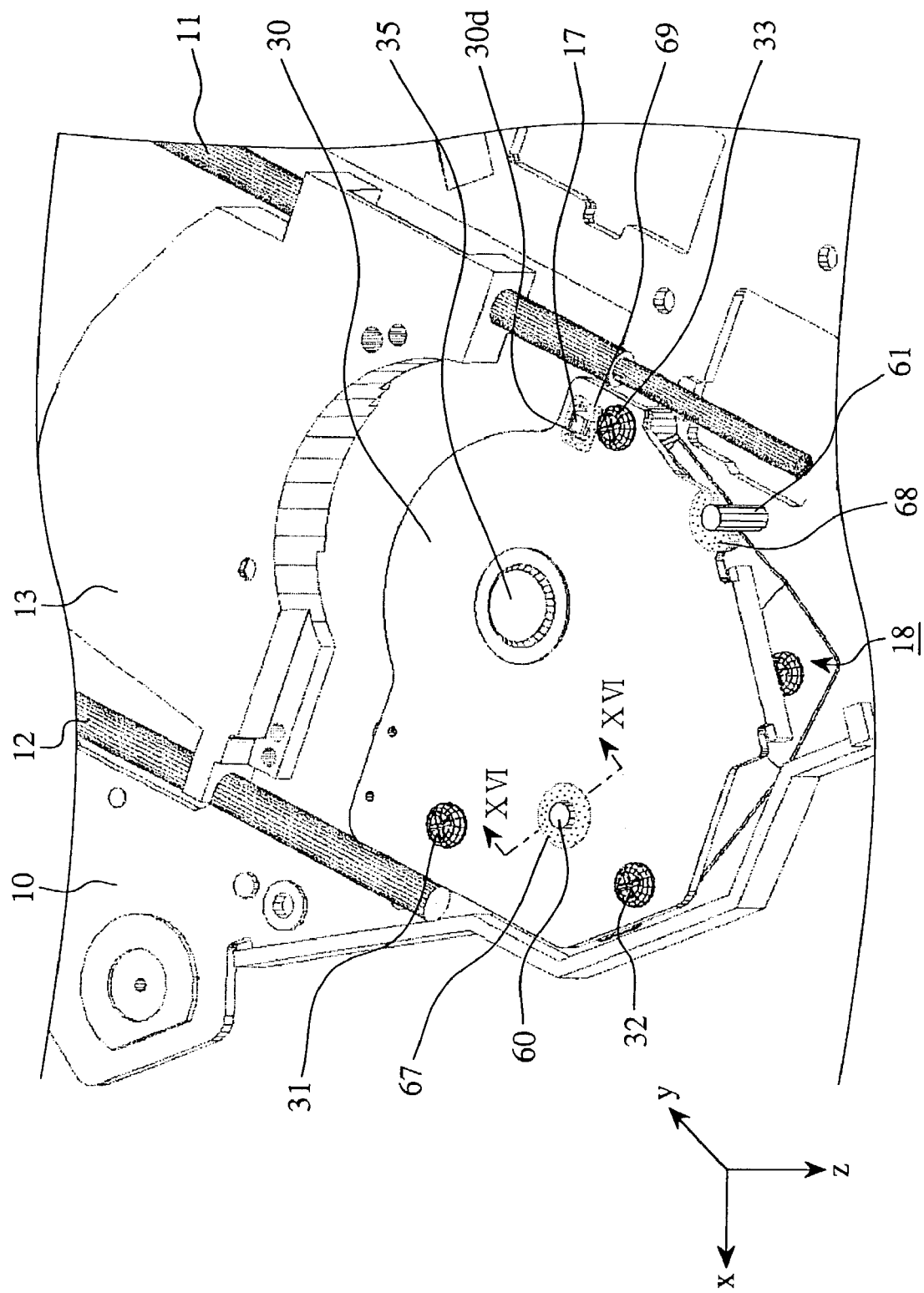
FIG. 15 is an exploded perspective view to show the structure, after adjustment, of the inclined angle adjusting mechanism in accordance with the embodiment 4 of the present invention and the structure of the disk device provided with the inclined angle adjusting mechanism.
Figure 16:
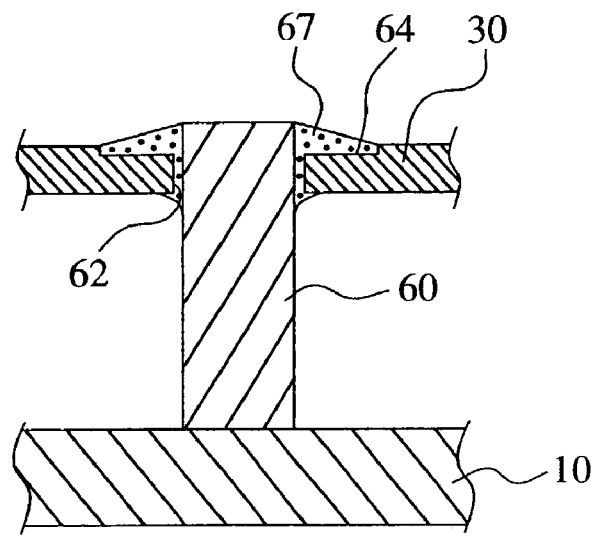
FIG. 16 is a cross sectional view taken on a line XVI—XVI in FIG. 15.
Figure 17:
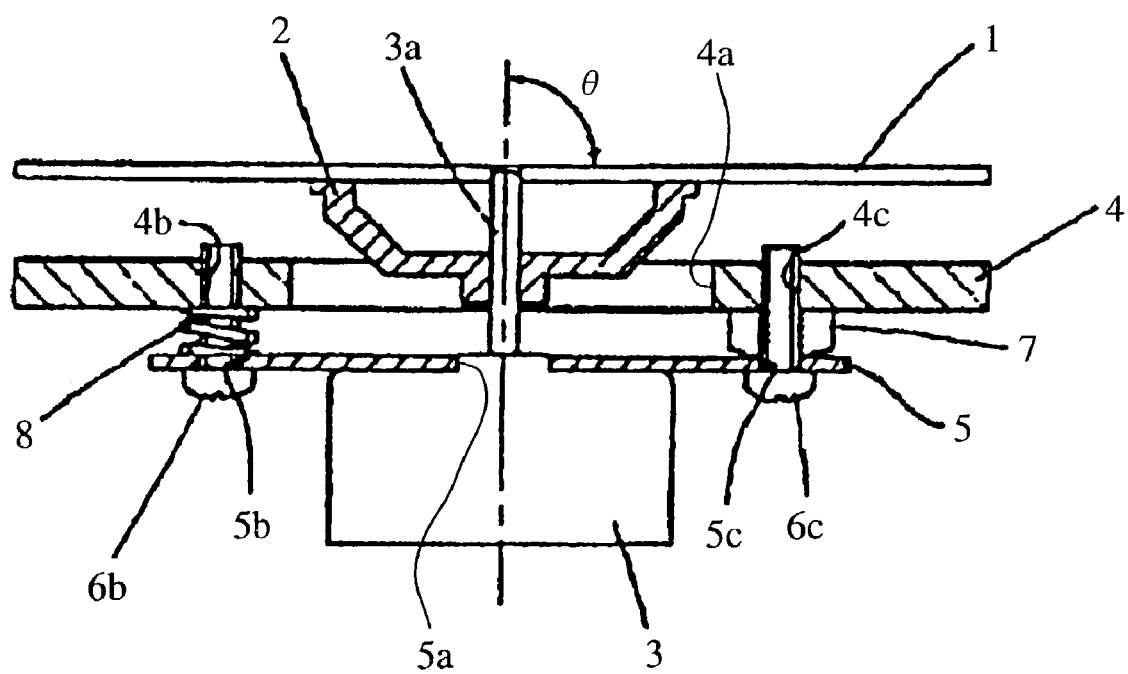
FIG. 17 is a cross sectional view to show the structure of an inclined angle adjusting mechanism in a disk device in the prior art.

FIG. 14 is an exploded perspective view to show the structure, before adjustment, of an inclined angle adjusting mechanism according to embodiment 4 of the present invention and the structure of a disk device provided with the inclined angle adjusting mechanism. FIG. 15 is an exploded perspective view to show the structure, after adjustment, of the inclined angle adjusting mechanism according to the embodiment 5 of the present invention and the structure of the disk device provided with the inclined angle adjusting mechanism. FIG. 16 is a cross sectional view taken on a line XVI—XVI in FIG. 5. Here, among the constituent components of the inclined angle adjusting mechanism according to this embodiment 5, the components common to the constituent components of the inclined angle mechanism of from the embodiment 1 to the embodiment 4 are denoted by the same reference symbols and their further descriptions will be omitted.

A feature of this embodiment 5 lies in that an angle between the optical axis (not shown) of the optical pickup 13 and the rotary shaft (not shown) of the disk motor 35 is adjusted and then the disk motor base 30 and the mechanical chassis base 10 are fixed with solder. That is to say, on the mechanical chassis base 10 are arranged cylindrical guide components 60 and 61. On the other hand, in the vicinity of the positioning hole 30a and screw hole 30b of the disk motor base 30 is made a through hole 62 engaged with the guide component 60 of the mechanical chassis base 10 and in the edge portion of the disk motor base 30 near the screw hole 30c is formed a semi-circular depressed portion 63 with which a part of the outer peripheral surface of the guide component 61 is put into sliding contact. Around the through hole 62, the depressed portion 63 and the detent hole 30d are formed land portions 64, 65, and 66 for soldering. Here, in the drawings, a reference numeral 67 denotes a soldered portion on the land portion 64, 68 denotes a soldered portion on the land portion 65, and 69 denotes a soldered portion for fixing the detent hole 30d and the detent part 17.

Next, an operation will be described.

The inclined angle of the disk motor base 30 with respect to the mechanical chassis base 10 is adjusted and then solder is applied to the land portions 64, 65, and 66 such that it covers the guide components 60, 61 and the detent part 17 to be bonded to them, thereby fixing the disk motor base 30 to the guide components 60, 61 and the detent part 17.

In this respect, in a case where the disk motor base 30 is removed from the mechanical chassis base 10, the applied solder is heated and removed and then the adjusting screws 32, 33 and the fixing screw 31 are removed. By repeating this operation, it is possible to fix and remove the disk motor base 30 over and over again.

As described above, according to this embodiment 5, it is possible to produce an effect of further fixing the disk motor base after adjustment and to prevent the disk motor base from being shifted in position and thus to improve reliability in holding the adjustment of the inclined angle.

In this embodiment 5, the solder can be removed by heating, so that in comparison with a case of fixing with an adhesive, it is possible to produce an effect of easily performing works such as replacing the disk motor base and the like.

What is claimed is:

1. An inclined angle adjusting mechanism comprising:
    a leaf spring which is provided on a mechanical chassis base for slidably holding an optical pickup in a disk device and urges a disk motor base for fixing a disk motor in a direction which separates the disk motor base from the mechanical chassis base; and
    an adjusting screw for applying a load to the leaf spring against its urging force,
    wherein the leaf spring is an integrated type leaf spring including a single metal plate and a plurality of spring pieces made by cutting and bending the metal plate, and of the integrated type metal spring, a narrow spring piece is bent in a direction in which it is deflected and is formed into a first spring portion having a first abutting portion contacting the disk motor base and a second spring portion having a second abutting portion contacting the mechanical chassis base, and
    wherein the second spring portion is formed at an extending portion of the first spring portion in the narrow spring piece.

2. The inclined angle adjusting mechanism according to claim 1, wherein the narrow spring piece is constructed in such a way that the second abutting portion of the second spring portion is put into contact with the mechanical chassis base in the process of screwing in the adjusting screw.

3. The inclined angle adjusting mechanism according to claim 1, wherein the disk motor base is provided with a screw hole having a V-shaped portion for positioning a fixing screw screwed in a top portion of a reference component arranged on the mechanical chassis base and a through hole formed near the V-shaped portion of the screw hole, and of the integrated type spring piece, a wide spring piece is provided with a pressing piece which is cut and bent in a direction opposite to a direction in which it is deflected and is inserted into the through hole of the disk motor base and when the fixing screw is screwed in, presses the reference component against the V-shaped portion of the screw hole.

4. An inclined angle adjusting method, comprising the steps of:
    adjusting an angle between an optical axis of an optical pickup and a rotary shaft of a disk motor in a disk device while applying a load to an integrated type leaf spring, which is provided on a mechanical chassis base for slidably holding the optical pickup and supports a disk motor base for fixing the disk motor, against its urging force by an adjusting screw; and then
    applying solder between a hole of the disk motor base and a reference component arranged on the mechanical chassis base to fix the disk motor base to the mechanical chassis base.

* * * * *